US 12,485,903 B2

(12) United States Patent
Jagbrant et al.

(10) Patent No.: US 12,485,903 B2
(45) Date of Patent: Dec. 2, 2025

(54) ROAD SURFACE ESTIMATION USING VEHICLE DETECTION

(71) Applicant: Qualcomm Auto LTD., Cambridge (GB)

(72) Inventors: Gustav Lars Henrik Jagbrant, Linköping (SE); Per Cronvall, Linköping (SE); Gustav Nils Ture Persson, Ljungsbro (SE)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/187,395

(22) Filed: Mar. 21, 2023

(65) Prior Publication Data

US 2024/0317237 A1  Sep. 26, 2024

(51) Int. Cl.
*B60W 40/06* (2012.01)
*G06T 7/70* (2017.01)
*G06V 20/56* (2022.01)
*G06V 20/58* (2022.01)

(52) U.S. Cl.
CPC ............. *B60W 40/06* (2013.01); *G06T 7/70* (2017.01); *G06V 20/58* (2022.01); *G06V 20/588* (2022.01); *B60W 2420/403* (2013.01); *B60W 2554/4041* (2020.02); *B60W 2554/80* (2020.02); *G06T 2207/20081* (2013.01); *G06T 2207/30252* (2013.01)

(58) Field of Classification Search
CPC .......... B60W 40/06; G06T 7/70; G06V 20/58; G06V 20/588
See application file for complete search history.

(56) References Cited

U.S. PATENT DOCUMENTS

2022/0397402 A1* 12/2022 Bolless .............. G01C 21/3841
2022/0406077 A1  12/2022 Kramadhari et al.

OTHER PUBLICATIONS

Eidehall A., et al., "Joint Road Geometry Estimation and Vehicle Tracking", Control Engineering Practice, Pergamon Press, Oxford, GB, vol. 15, No. 12, Oct. 1, 2007, pp. 1484-1494, XP022282170, The Whole Document.
International Search Report and Written Opinion—PCT/EP2024/056232—ISA/EPO—Apr. 12, 2024.

* cited by examiner

*Primary Examiner* — Scott A Browne
*Assistant Examiner* — Josephine Elizabeth Rich
(74) *Attorney, Agent, or Firm* — QUALCOMM Incorporated

(57) ABSTRACT

Various aspects of the present disclosure generally relate to autonomous driving and driver assistance systems. In some aspects, a device associated with an ego vehicle may obtain a series of images that depict a reference vehicle traveling along a road segment ahead of the ego vehicle. The device may estimate, based on the series of images, a size of the reference vehicle and/or a position of the reference vehicle relative to the ego vehicle. The device may track a trajectory of the reference vehicle along the road segment ahead of the ego vehicle based on the estimated size of the reference vehicle and/or the estimated position of the reference vehicle over the series of images. The device may estimate a surface geometry associated with the road segment ahead of the ego vehicle based on the tracked trajectory of the reference vehicle. Numerous other aspects are described.

30 Claims, 6 Drawing Sheets

ROAD SURFACE ESTIMATION USING VEHICLE DETECTION

FIELD OF THE DISCLOSURE

Aspects of the present disclosure generally relate to autonomous driving and/or an advanced driver assistance system (ADAS) and, for example, to estimating a road surface geometry using vehicle detection in conditions where a road surface may otherwise be difficult to estimate from direct visual observation.

BACKGROUND

Autonomous driving systems are an emerging technology that allows a vehicle to operate without human input, following a pre-programmed route or responding to real-time environmental conditions. Autonomous driving systems generally use a combination of sensors, cameras, and software algorithms to perceive the environment and make decisions based on the perceived environment. Autonomous driving technology may be designed to create a safer, more efficient, and more convenient mode of transportation that reduces the need for human intervention. The development of autonomous driving systems has been driven by a convergence of factors (e.g., advancements in sensor technology, artificial intelligence, and machine learning) that have enabled vehicles to sense and process information from the surrounding environment (e.g., road conditions, traffic, and pedestrians).

SUMMARY

Some aspects described herein relate to a method for road surface estimation using vehicle detection. The method may include obtaining, by a device associated with an ego vehicle, a series of images that depict a reference vehicle traveling along a road segment ahead of the ego vehicle. The method may include estimating, by the device based on the series of images, one or more of a size of the reference vehicle or a position of the reference vehicle relative to the ego vehicle. The method may include tracking, by the device, a trajectory of the reference vehicle along the road segment ahead of the ego vehicle based on one or more of the estimated size of the reference vehicle or the estimated position of the reference vehicle over the series of images. The method may include estimating, by the device, a surface geometry associated with the road segment ahead of the ego vehicle based on the tracked trajectory of the reference vehicle.

Some aspects described herein relate to a device for road surface estimation using vehicle detection. The device may include a memory and one or more processors coupled to the memory. The one or more processors may be configured to obtain a series of images that depict a reference vehicle traveling along a road segment ahead of an ego vehicle. The one or more processors may be configured to estimate, based on the series of images, one or more of a size of the reference vehicle or a position of the reference vehicle relative to the ego vehicle. The one or more processors may be configured to track a trajectory of the reference vehicle along the road segment ahead of the ego vehicle based on one or more of the estimated size of the reference vehicle or the estimated position of the reference vehicle over the series of images. The one or more processors may be configured to estimate a surface geometry associated with the road segment ahead of the ego vehicle based on the tracked trajectory of the reference vehicle.

Some aspects described herein relate to a non-transitory computer-readable medium that stores a set of instructions. The set of instructions, when executed by one or more processors of a device, may cause the device to obtain a series of images that depict a reference vehicle traveling along a road segment ahead of an ego vehicle. The set of instructions, when executed by one or more processors of the device, may cause the device to estimate, based on the series of images, one or more of a size of the reference vehicle or a position of the reference vehicle relative to the ego vehicle. The set of instructions, when executed by one or more processors of the device, may cause the device to track a trajectory of the reference vehicle along the road segment ahead of the ego vehicle based on one or more of the estimated size of the reference vehicle or the estimated position of the reference vehicle over the series of images. The set of instructions, when executed by one or more processors of the device, may cause the device to estimate a surface geometry associated with the road segment ahead of the ego vehicle based on the tracked trajectory of the reference vehicle.

Some aspects described herein relate to an apparatus. The apparatus may include means for obtaining a series of images that depict a reference vehicle traveling along a road segment ahead of an ego vehicle. The apparatus may include means for estimating, based on the series of images, one or more of a size of the reference vehicle or a position of the reference vehicle relative to the ego vehicle. The apparatus may include means for tracking a trajectory of the reference vehicle along the road segment ahead of the ego vehicle based on one or more of the estimated size of the reference vehicle or the estimated position of the reference vehicle over the series of images. The apparatus may include means for estimating a surface geometry associated with the road segment ahead of the ego vehicle based on the tracked trajectory of the reference vehicle.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
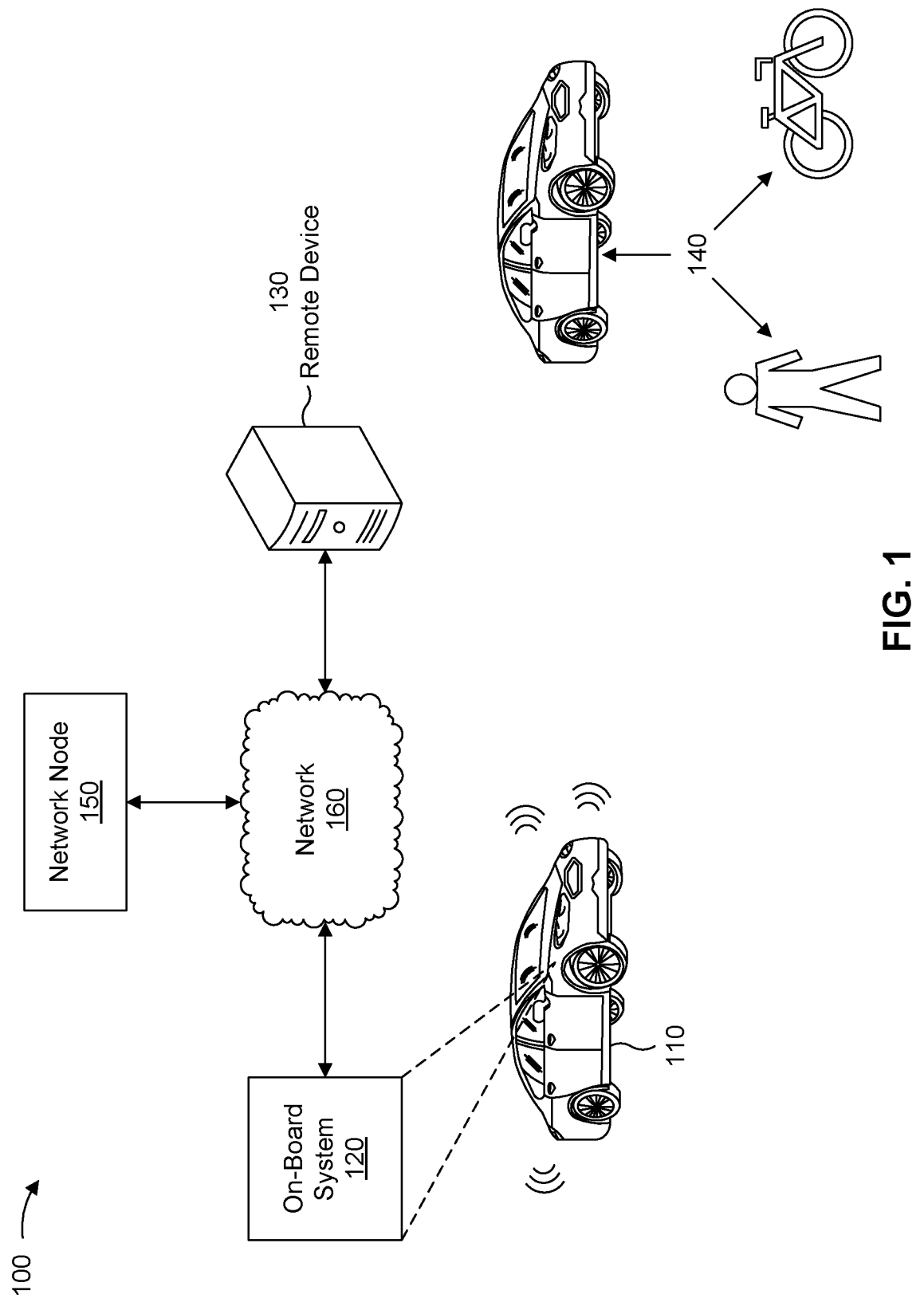
FIG. 1 is a diagram of an example environment in which an autonomous vehicle or a vehicle equipped with an advanced driver assistance system (ADAS) may operate, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Estimating a road surface in terms of trajectory, shape, alignment, profile, and/or other parameters is used in many autonomous driving and/or advanced driver assistance system (ADAS) applications in order to enable the autonomous driving and/or ADAS application to make an informed decision regarding how to navigate the road safely and efficiently. For example, estimating a road surface may be critical to maintain control over an autonomous vehicle or a vehicle equipped with an ADAS because different road surfaces (e.g., concrete, asphalt, and gravel) have different traction levels and/or may require different handling characteristics. In addition, the alignment (e.g., horizontal tangents and curves) and profile (e.g., vertical aspect, including crest and sag curves and connecting straight grade lines) of a road surface serve an important role in vehicle control because changes in the geometry of the road surface can affect vehicle stability and handling. In another example, many autonomous driving and ADAS applications rely on road surface information to keep a vehicle within a designated lane (e.g., by estimating a road alignment and profile, an autonomous vehicle or ADAS application can make corrections to maintain a consistent path, even in cases where there are changes in the road surface). Furthermore, road surface information can be used for obstacle avoidance (e.g., by anticipating changes in the road geometry and adjusting a vehicle trajectory accordingly to avoid potential obstacles) and/or other suitable applications (e.g., route planning).

In general, information related to a road surface geometry is typically estimated using camera-based vision systems. For example, monocular camera-based vision techniques may use a single camera to capture images of a road, and the images may be analyzed using computer vision algorithms to estimate a position of the vehicle relative to the road as well as the shape of the road surface, the location of lane markers, and/or other suitable road surface information. In another example, stereo camera-based vision uses two cameras to capture images of the road, allowing for depth perception and the creation of three-dimensional (3D) models of the road surface that can then be used to estimate the height and slope of the road as well as the position of objects on or near the road. In still another example, light detection and ranging (lidar) uses laser light to create a 3D map of the road surface. Accordingly, existing techniques that use camera-based vision systems to estimate a road surface geometry are generally focused on capturing and analyzing images of the road surface. However, there are various situations where an accurate estimate of the road surface may be difficult to achieve through direct visual observation of the road surface. For example, the road surface may not be visible in images that are captured in adverse weather or adverse light conditions (e.g., fog, rain, snow, glare, and/or night), when the road surface is occluded (e.g., by other vehicles, vegetation, and/or stationary or moving objects), and/or when there are undulating roads (e.g., having a rising and falling form that causes portions of the road to not be visible).

In some aspects described herein, an on-board system or device associated with an ego vehicle may capture or otherwise obtain a series of images that depict one or more reference vehicles traveling along a road segment ahead of the ego vehicle and analyze the size and/or position of the reference vehicles in the series of images to estimate the surface geometry of the road segment ahead of the ego vehicle. For example, because the reference vehicles are traveling along the road segment ahead of the ego vehicle, the trajectory of the reference vehicles can be tracked over the series of images and used to estimate the surface geometry of the upcoming road segment ahead of the ego vehicle. Accordingly, because vehicles may be more visible than the road surface in adverse conditions and vehicles are rigid objects with a fixed size that does not change over time, an accurate size estimate for a vehicle at one point in time will continue to be accurate as time progresses and may therefore serve as a scale reference. In this way, by tracking the size and relative position of a reference vehicle over time (e.g., over a series of images), a trajectory traveled by the reference vehicle may be tracked and used to estimate the surface geometry of the road segment traveled by the reference vehicle. Furthermore, by using visual odometry and/or vehicle sensors (e.g., inertial measurement units and/or positioning systems, among other examples), an accurate estimate of the road surface traveled by the ego vehicle may be determined. Accordingly, by comparing the accurate trajectory of the ego vehicle over a traveled portion of a road segment with the reference vehicle trajectory that was estimated for the traveled portion of the road segment, the size estimate of the reference vehicle may be refined and used to improve the estimate of the road surface for an untraveled portion of the road segment.

FIG. 1 is a diagram of an example environment 100 in which an autonomous vehicle or a vehicle equipped with an advanced driver assistance system (ADAS) may operate, in accordance with the present disclosure. As shown in FIG. 1, the environment 100 may include, for example, a vehicle 110, an on-board system 120 of the vehicle 110, a remote device 130, a network node 150, and a network 160. Devices of the environment 100 may interconnect via wired connections, wireless connections, or a combination of wired and wireless connections. As further shown in FIG. 1, the environment 100 may include one or more objects 140 that the vehicle 110 is configured to detect (e.g., using the on-board system 120).

In some aspects, the vehicle 110 may include any moving form of conveyance that is capable of carrying one or more human occupants and/or cargo and that is powered by any suitable energy source. For example, the vehicle 110 may include a land vehicle (e.g., a car, a truck, a van, or a train), an aircraft (e.g., an unmanned aerial vehicle), and/or a watercraft. In the example depicted in FIG. 1, the vehicle 110 is a land vehicle, and is shown as a car. Furthermore, the vehicle 110 is an autonomous vehicle in the example of FIG. 1. For example, an autonomous vehicle (AV) is a vehicle having a processor, programming instructions, and drivetrain components that are controllable by the processor without requiring a human operator. An autonomous vehicle may be fully autonomous in that the autonomous vehicle does not require a human operator for most or all driving conditions and functions, or an autonomous vehicle may be semi-autonomous in that a human operator may be required in certain conditions or for certain operations, or that a human operator may override the autonomous system of the autonomous vehicle and take control of the autonomous vehicle. Additionally, or alternatively, the vehicle 110 may be equipped with an ADAS that supports one or more safety features and/or technologies to help drivers avoid collisions and/or accidents (e.g., adaptive cruise control, lane departure warning, automatic emergency braking) or otherwise make driving the vehicle 110 safer and/or more efficient.

As shown in FIG. 1, the vehicle 110 may include an on-board system 120 that is integrated into and/or coupled with the vehicle 110. In general, the on-board system 120 may be used to control the vehicle 110, to sense information about the vehicle 110 and/or an environment in which the vehicle 110 operates, to detect one or more objects 140 in proximity of the vehicle, to provide output to or receive input from an occupant of the vehicle 110, and/or to communicate with one or more devices remote from the vehicle 110, such as another vehicle and/or the remote device 130. Accordingly, as described herein, the vehicle 110 may be an ego vehicle, which refers to the subject vehicle that is using autonomous driving technology, an ADAS, and/or one or more sensors (e.g., cameras, lidars, and radars) to perceive a surrounding environment and make decisions related to a trajectory, speed, and/or actions of the vehicle 110 on the road. The on-board system 120 is described in more detail below in connection with FIG. 2.

In some aspects, the vehicle 110 may travel along a road in a semi-autonomous or autonomous manner. The vehicle 110 may be configured to detect objects 140 in proximity of the vehicle 110. An object 140 may include, for example, another vehicle (e.g., an autonomous vehicle or a non-autonomous vehicle that requires a human operator for most or all driving conditions and functions), a cyclist (e.g., a rider of a bicycle, electric scooter, or motorcycle), a pedestrian, a road feature (e.g., a roadway boundary, a lane marker, a sidewalk, a median, a guard rail, a barricade, a sign, a traffic signal, a railroad crossing, or a bike path), and/or another object that may be on a roadway or in proximity of a roadway, such as a tree or an animal. In some aspects, to detect objects 140, the vehicle 110 may be equipped with a camera-based vision system and/or one or more sensors, such as a lidar system. In some aspects, the camera-based vision system and/or the one or more sensors may be included in another system other than the vehicle 110, such as a robot, a satellite, and/or a traffic light.

In some aspects, the one or more sensors may provide object detection data, such as information about a detected object 140 (e.g., information about a distance to the object 140, a speed of the object 140, and/or a direction of movement of the object 140) to one or more other components of the on-board system 120. Additionally, or alternatively, the vehicle 110 may transmit the object detection data to the remote device 130 (e.g., a server, a cloud computing system, and/or a database) via the network 160 (e.g., via the network node 150). The remote device 130 may be configured to process the object detection data and/or to transmit a result of processing the object detection data to the vehicle 110 via the network 160 (e.g., via the network node 150).

In some aspects, the network node 150 includes one or more devices configured to receive, generate, store, process, and/or provide information related to one or more aspects described herein. For example, the network node 150 may include a base station (a Node B, a gNB, and/or a 5G node B (NB), among other examples), a user equipment (UE), a relay device, a network controller, an access point, a transmission reception point (TRP), an apparatus, a device, a computing system, and/or another suitable processing entity configured to perform one or more aspects described herein. For example, in some aspects, the network node 150 may include an aggregated base station and/or one or more components of a disaggregated base station (e.g., a central unit, a distributed unit, and/or a radio unit) that enables the on-board system 120 to communicate over the network 160 (e.g., to invoke or otherwise utilize processing capabilities associated with the remote device 130).

The network 160 includes one or more wired and/or wireless networks. For example, the network 160 may include a cellular network (e.g., a Long-Term Evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, the network 160 enables communication among the devices of environment 100.

In some aspects, as described herein, the on-board system 120 may be configured to obtain a series of images that depict a reference vehicle traveling along a road segment ahead of the vehicle 110; estimate, based on the series of images, one or more of a size of the reference vehicle or a position of the reference vehicle relative to the vehicle 110; track a trajectory of the reference vehicle along the road segment ahead of the vehicle 110 based on one or more of the estimated size of the reference vehicle or the estimated position of the reference vehicle over the series of images;

and estimate a surface geometry associated with the road segment ahead of the vehicle 110 based on the tracked trajectory of the reference vehicle.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
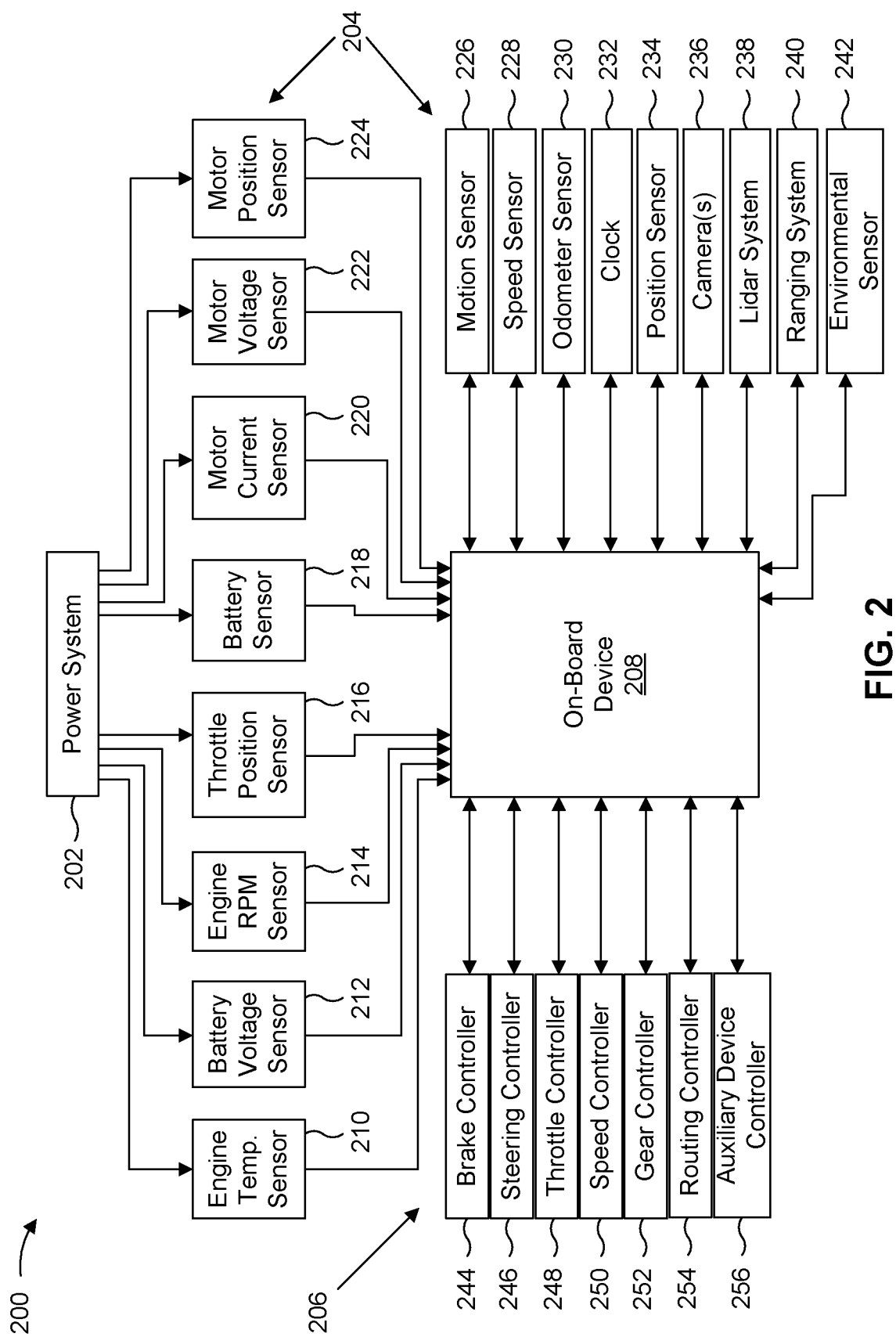
FIG. 2 is a diagram of an example on-board system of an autonomous vehicle or a vehicle equipped with an ADAS, in accordance with the present disclosure.

FIG. 2 is a diagram of an example on-board system 200 of an autonomous vehicle or a vehicle equipped with an ADAS, in accordance with the present disclosure. In some aspects, the on-board system 200 may correspond to the on-board system 120 included in the vehicle 110, as described above in connection with FIG. 1. As shown in FIG. 2, the on-board system 200 may include one or more of the illustrated components 202-256. The on-board system 200 may include, for example, a power subsystem 202, a sensor subsystem 204, a control subsystem 206, and/or an on-board device 208. The components of the on-board system 200 may communicate via a bus (e.g., one or more wired and/or wireless connections), such as a controller area network (CAN) bus.

The power subsystem 202 may be configured to generate mechanical energy for the vehicle 110 to move the vehicle 110. For example, the power subsystem 202 may include an engine that converts fuel to mechanical energy (e.g., via combustion) and/or a motor that converts electrical energy to mechanical energy.

The sensor subsystem 204 may include one or more sensors configured to detect operational parameters of the vehicle 110 and/or environmental conditions in an environment in which the vehicle 110 operates (e.g., surrounding the vehicle 110). For example, the sensor subsystem 204 may include an engine temperature sensor 210, a battery voltage sensor 212, an engine rotations per minute (RPM) sensor 214, a throttle position sensor 216, a battery sensor 218 (e.g., to measure current, voltage, and/or temperature of a battery), a motor current sensor 220, a motor voltage sensor 222, a motor position sensor 224 (e.g., a resolver and/or encoder), a motion sensor 226 (e.g., an accelerometer, gyroscope and/or inertial measurement unit), a speed sensor 228, an odometer sensor 230, a clock 232, a position sensor 234 (e.g., a global navigation satellite system (GNSS) sensor and/or a global positioning system (GPS) sensor), one or more cameras 236, a lidar system 238, one or more other ranging systems 240 (e.g., a radar system and/or a sonar system), and/or an environmental sensor 242 (e.g., a precipitation sensor and/or ambient temperature sensor).

The control subsystem 206 may include one or more controllers configured to control operation of the vehicle 110. For example, the control subsystem 206 may include a brake controller 244 to control braking of the vehicle 110, a steering controller 246 to control steering and/or direction of the vehicle 110, a throttle controller 248 and/or a speed controller 250 to control speed and/or acceleration of the vehicle 110, a gear controller 252 to control gear shifting of the vehicle 110, a routing controller 254 to control navigation and/or routing of the vehicle 110 (e.g., using map data), and/or an auxiliary device controller 256 to control one or more auxiliary devices associated with the vehicle 110, such as a testing device, an auxiliary sensor, and/or a mobile device transported by the vehicle 110.

The on-board device 208 may be configured to receive sensor data from one or more sensors included in the sensor subsystem 204 and/or to provide commands to one or more controllers included in the control subsystem 206. For example, the on-board device 208 may control operation of the vehicle 110 by providing a command to a controller included in the control subsystem 206 based on sensor data received from a sensor included in the sensor subsystem 204. In some aspects, the on-board device 208 may be configured to process sensor data to generate a command. The on-board device 208 may include memory, one or more processors, an input component, an output component, and/or a communication component, as described elsewhere herein.

As an example, the on-board device 208 may receive navigation data, such as information associated with a navigation route from a start location of the vehicle 110 to a destination location for the vehicle 110. In some aspects, the navigation data is accessed and/or generated by the routing controller 254. For example, the routing controller 254 may access map data and identify possible routes and/or road segments that the vehicle 110 can travel to move from the start location to the destination location. In some aspects, the routing controller 254 may identify a preferred route, such as by scoring multiple possible routes, applying one or more routing techniques (e.g., minimum Euclidean distance, Dijkstra's algorithm, and/or Bellman-Ford algorithm), accounting for traffic data, and/or receiving a user selection of a route, among other examples. The on-board device 208 may use the navigation data to control operation of the vehicle 110. As the vehicle travels along the route, the on-board device 208 may receive sensor data from various sensors in the sensor subsystem 204. For example, the position sensor 234 may provide geographic location information to the on-board device 208, which may then access a map associated with the geographic location information to determine known fixed features associated with the geographic location, such as streets, buildings, stop signs, and/or traffic signals, which may be used to control operation of the vehicle 110.

In some aspects, the on-board device 208 may receive one or more images captured by one or more cameras 236, may analyze the one or more images (e.g., to detect object data), and may control operation of the vehicle 110 based on analyzing the images (e.g., to avoid detected objects). For example, the on-board device 208 may obtain, from the camera(s) 236, a series of images that depict a reference vehicle traveling along a road segment ahead of the vehicle 110, and the on-board device 208 may analyze the series of images to estimate a size of the reference vehicle and/or a position of the reference vehicle relative to the vehicle 110. The on-board device 208 may track a trajectory of the reference vehicle along the road segment ahead of the vehicle 110 based on the estimated size of the reference vehicle and/or the estimated position of the reference vehicle over the series of images and may estimate a surface geometry associated with the road segment ahead of the vehicle 110 based on the tracked trajectory of the reference vehicle. Accordingly, the on-board system 208 may generate one or more control signals (e.g., to control the vehicle 110, stay within a designated lane, avoid an obstacle, and/or plan a route) based on the estimated surface geometry associated with the road segment ahead of the vehicle 110.

In some aspects, the on-board device 208 may receive object data associated with one or more objects detected in a vicinity of the vehicle 110 and/or may generate object data based on sensor data. The object data may indicate the presence or absence of an object, a location of the object, a distance between the object and the vehicle 110, a speed of the object, a direction of movement of the object, an acceleration of the object, a trajectory (e.g., a heading) of the object, a shape of the object, a size of the object, a footprint of the object, and/or a type of the object (e.g., a vehicle, a pedestrian, a cyclist, a stationary object, or a moving object). The object data may be detected, for example, by one or more cameras 236 (e.g., as image data), the lidar system 238 (e.g., as lidar data) and/or one or more other ranging systems 240 (e.g., as radar data or sonar data). The on-board device 208 may process the object data to detect objects in proximity of the vehicle 110 and/or to control operation of the vehicle 110 based on the object data (e.g., to avoid detected objects).

In some aspects, the on-board device 208 may use the object data (e.g., current object data) to predict future object data for one or more objects. For example, the on-board device 208 may predict a future location of an object, a future distance between the object and the vehicle 110, a future speed of the object, a future direction of movement of the object, a future acceleration of the object, and/or a future trajectory (e.g., a future heading) of the object. For example, if an object is a vehicle and map data indicates that the vehicle is at an intersection, then the on-board device 208 may predict whether the object will likely move straight or turn. As another example, if the sensor data and/or the map data indicates that the intersection does not have a traffic light, then the on-board device 208 may predict whether the object will stop prior to entering the intersection.

The on-board device 208 may generate a motion plan for the vehicle 110 based on sensor data, navigation data, and/or object data (e.g., current object data and/or future object data). For example, based on current locations of objects and/or predicted future locations of objects, the on-board device 208 may generate a motion plan to move the vehicle 110 along a surface and avoid collision with other objects. In some aspects, the motion plan may include, for one or more points in time, a speed of the vehicle 110, a direction of the vehicle 110, and/or an acceleration of the vehicle 110. Additionally, or alternatively, the motion plan may indicate one or more actions with respect to a detected object, such as whether to overtake the object, yield to the object, pass the object, or the like. The on-board device 208 may generate one or more commands or instructions based on the motion plan, and may provide those command(s) to one or more controllers associated with the control subsystem 206 for execution.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single components, or a single components shown in FIG. 2 may be implemented as multiple, distributed components. Additionally, or alternatively, a set of components (e.g., one or more components) shown in FIG. 2 may perform one or more functions described as being performed by another set of components shown in FIG. 2. For example, although some components of FIG. 2 are primarily associated with land vehicles, other types of vehicles are within the scope of the disclosure.

Figure 3:
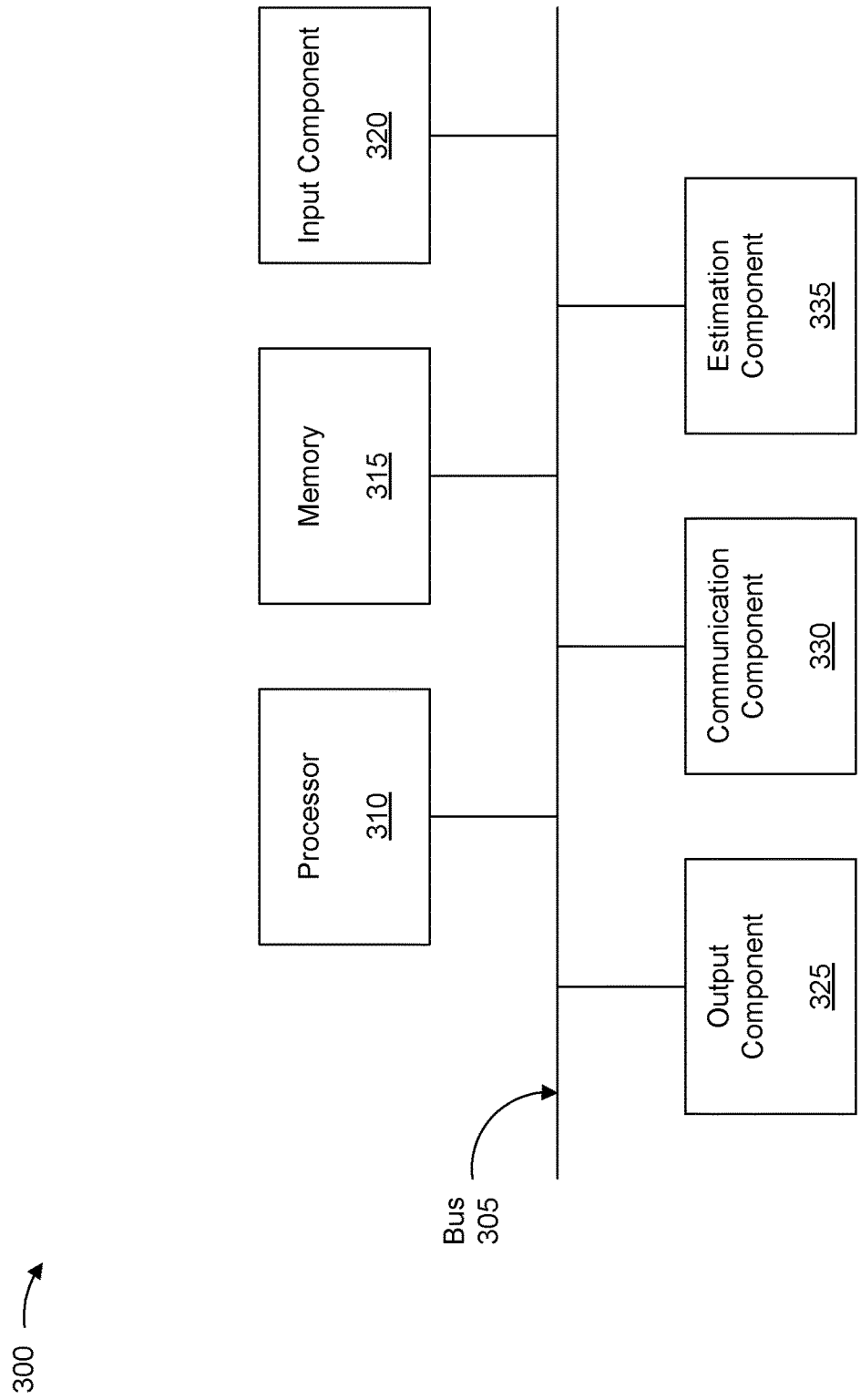
FIG. 3 is a diagram illustrating example components of one or more devices shown in FIG. 1 and/or FIG. 2, in accordance with the present disclosure.

FIG. 3 is a diagram illustrating example components of a device 300, in accordance with the present disclosure. The device 300 may correspond to the on-board system 120, the remote device 130, or the network node 150 depicted in FIG. 1, the on-board system 200 or the on-board device 208 depicted in FIG. 2, and/or any other device, system, subsystem, or component described herein. In some aspects, the on-board system 120, the remote device 130, the network node 150, the on-board system 200, the on-board device 208, and/or other devices, systems, subsystems, or components described herein may include one or more devices 300 and/or one or more components of the device 300. As shown in FIG. 3, the device 300 may include a bus 305, a processor 310, a memory 315, an input component 320, an output component 325, a communication component 330, and/or an estimation component 335.

The bus 305 may include one or more components that enable wired and/or wireless communication among the components of the device 300. The bus 305 may couple together two or more components of FIG. 3, such as via operative coupling, communicative coupling, electronic coupling, and/or electric coupling. For example, the bus 305 may include an electrical connection (e.g., a wire, a trace, and/or a lead) and/or a wireless bus. The processor 310 may include a central processing unit, a graphics processing unit, a microprocessor, a controller, a microcontroller, a digital signal processor, a field-programmable gate array, an application-specific integrated circuit, and/or another type of processing component. The processor 310 may be implemented in hardware, firmware, or a combination of hardware and software. In some aspects, the processor 310 may include one or more processors capable of being programmed to perform one or more operations or processes described elsewhere herein.

The memory 315 may include volatile and/or nonvolatile memory. For example, the memory 315 may include random access memory (RAM), read only memory (ROM), a hard disk drive, and/or another type of memory (e.g., a flash memory, a magnetic memory, and/or an optical memory). The memory 315 may include internal memory (e.g., RAM, ROM, or a hard disk drive) and/or removable memory (e.g., removable via a universal serial bus connection). The memory 315 may be a non-transitory computer-readable medium. The memory 315 may store information, one or more instructions, and/or software (e.g., one or more software applications) related to the operation of the device 300. In some aspects, the memory 315 may include one or more memories that are coupled (e.g., communicatively coupled) to one or more processors (e.g., processor 310), such as via the bus 305. Communicative coupling between a processor 310 and a memory 315 may enable the processor 310 to read and/or process information stored in the memory 315 and/or to store information in the memory 315.

The input component 320 may enable the device 300 to receive input, such as user input and/or sensed input. For example, the input component 320 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 325 may enable the device 300 to provide output, such as via a display, a speaker, and/or a light-emitting diode. The communication component 330 may enable the device 300 to communicate with other devices via a wired connection and/or a wireless connection. For example, the communication component 330 may include a receiver, a transmitter, a transceiver, a modem, a network interface card, and/or an antenna.

The estimation component 335 may obtain a series of images that depict a reference vehicle traveling along a road segment ahead of an ego vehicle; estimate, based on the series of images, a size of the reference vehicle and/or a position of the reference vehicle relative to the ego vehicle; track a trajectory of the reference vehicle along the road segment ahead of the ego vehicle based on the estimated size of the reference vehicle and/or the estimated position of the reference vehicle over the series of images; and estimate a surface geometry associated with the road segment ahead of the ego vehicle based on the tracked trajectory of the reference vehicle.

The device 300 may perform one or more operations or processes described herein. For example, a non-transitory computer-readable medium (e.g., memory 315) may store a set of instructions (e.g., one or more instructions or code) for execution by the processor 310. The processor 310 may execute the set of instructions to perform one or more operations or processes described herein. In some aspects, execution of the set of instructions, by one or more processors 310, causes the one or more processors 320 and/or the device 300 to perform one or more operations or processes described herein. In some aspects, hardwired circuitry may be used instead of or in combination with the instructions to perform one or more operations or processes described herein. Additionally, or alternatively, the processor 310 may be configured to perform one or more operations or processes described herein. Thus, aspects described herein are not limited to any specific combination of hardware circuitry and software.

In some aspects, device 300 may include means for obtaining a series of images that depict a reference vehicle traveling along a road segment ahead of an ego vehicle; means for estimating, based on the series of images, one or more of a size of the reference vehicle or a position of the reference vehicle relative to the ego vehicle; means for tracking a trajectory of the reference vehicle along the road segment ahead of the ego vehicle based on one or more of the estimated size of the reference vehicle or the estimated position of the reference vehicle over the series of images; and/or means for estimating a surface geometry associated with the road segment ahead of the ego vehicle based on the tracked trajectory of the reference vehicle. In some aspects, the means for device 300 to perform processes and/or operations described herein may include one or more components of device 300 described in connection with FIG. 3, such as bus 305, processor 310, memory 315, input component 320, output component 325, communication component 330, and/or estimation component 335. Additionally, or alternatively, the means for device 300 to perform processes and/or operations described herein may include one or more components of the on-board system 200 described in connection with FIG. 2, such as the sensor subsystem 204, the control subsystem 206, and/or the on-board device 208, among other examples.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4A:
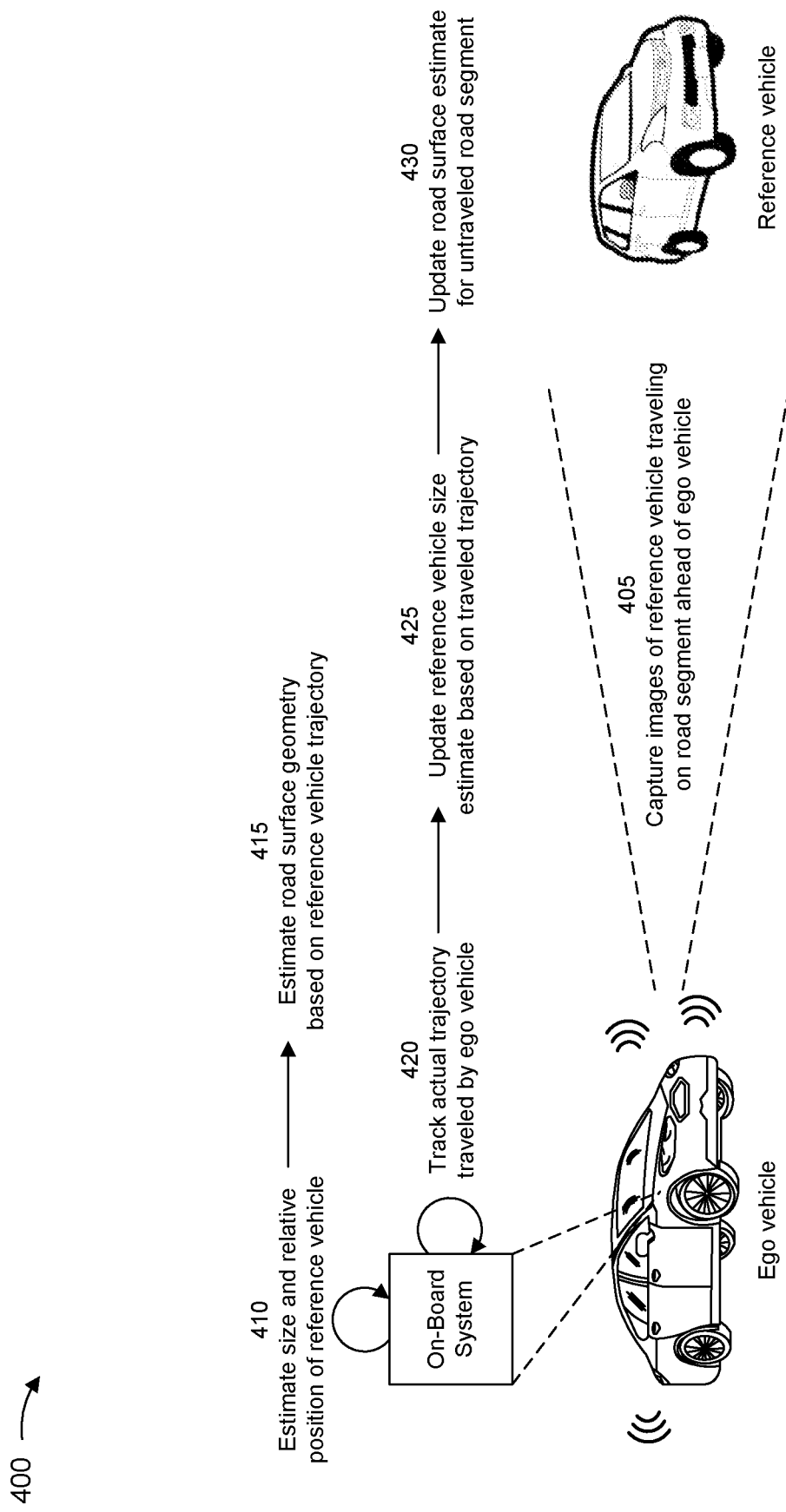
FIGS. 4A-4B are diagrams illustrating examples associated with estimating a road surface using vehicle detection, in accordance with the present disclosure.
Figure 4B:
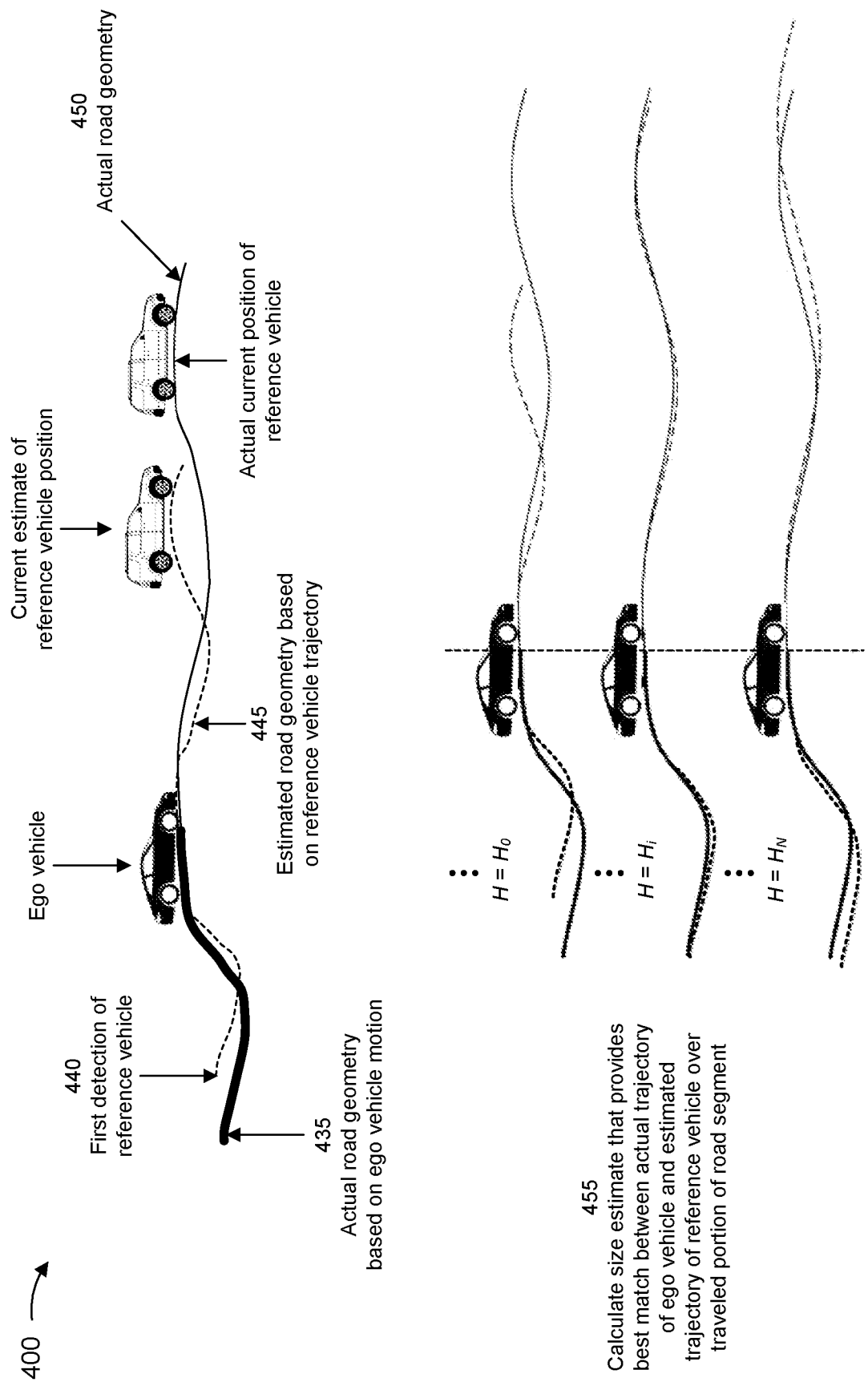

FIGS. 4A-4B are diagrams illustrating examples 400 associated with estimating a road surface using vehicle detection, in accordance with the present disclosure. As shown in FIGS. 4A-4B, examples 400 include an ego vehicle (e.g., vehicle 110) equipped with an on-board system (e.g., on-board system 120, on-board system 200, and/or on-board device 208) that supports autonomous driving and/or ADAS technology. As further shown in FIGS. 4A-4B, examples 400 include a reference vehicle traveling on a road segment ahead of the ego vehicle. Accordingly, as described herein, examples 400 relate to techniques that may be implemented in the on-board system of the ego vehicle to estimate a surface geometry of a road surface ahead of the ego vehicle based on detections of the reference vehicle that are tracked over time.

For example, as shown in FIG. 4A, and by reference number 405, the on-board system associated with the ego vehicle may obtain a series of images that depict the reference vehicle while the reference vehicle is traveling along a road segment ahead of the ego vehicle. For example, in some aspects, the on-board system may include or may receive input from a camera system that can capture the series of images that depict the reference vehicle traveling along the road segment ahead of the ego vehicle, and the series of images may then be analyzed to estimate a surface geometry associated with the road segment ahead of the ego vehicle, using techniques described in further detail herein. In some aspects, the camera system may include a monocular camera system that uses a single camera to capture images of the surroundings of the ego vehicle. Additionally, or alternatively, the camera system may include a stereo-based vision system that uses two cameras mounted on either side of the ego vehicle to capture the images from slightly different angles. In some aspects, the camera(s) used to capture the series of images that depict the reference vehicle may include one or more forward-facing cameras (e.g., mounted on the front of the ego vehicle), one or more surround-view cameras (e.g., using multiple cameras positioned around the ego vehicle to provide a 360 degree view of the surroundings of the ego vehicle), and/or one or more infrared cameras that can be used to detect objects in low-light conditions.

As further shown in FIG. 4A, and by reference number 410, the on-board system may estimate a size of the reference vehicle based on the series of images, and the on-board system may further estimate a position of the reference vehicle relative to a position of the ego vehicle in each image. For example, as described herein, the reference vehicle is a rigid object that has a fixed size, whereby the estimated size of the reference vehicle may serve as a scale reference for estimating a distance between the ego vehicle and the reference vehicle in each image of the reference vehicle. For example, in cases where the reference vehicle appears smaller in a first image than a second image, the reference vehicle is closer to the ego vehicle in the second image. Accordingly, in some aspects, the on-board system may estimate a measurement related to the size of the reference vehicle in order to determine a scale reference for estimating the position of the reference vehicle relative to a position of the ego vehicle in each image. For example, the on-board system may estimate a height of the reference vehicle, a width of the reference vehicle, or a dimension associated with any other suitable feature of the reference vehicle (e.g., a wheel size, a license plate size, a taillight size, and/or a rear window size, among other examples). In some aspects, in cases where the measurement is dependent on a design of the reference vehicle, the on-board system may use computer vision techniques to determine one or more parameters that indicate the design of the reference vehicle (e.g., a body style, a make and model, or the like), which may be used to determine the appropriate size estimate (e.g., a height estimate for a bus or semi-trailer truck may be significantly larger than a height estimate for a sedan or compact car). Accordingly, in some aspects, the measurement related to the size of the reference vehicle may be estimated using a machine learning model (e.g., a neural network or other model that implements computer vision techniques or other suitable techniques to estimate the size of a visual feature associated with the reference vehicle). In any case, the on-board system may use the estimated measurement related to the size of the reference vehicle to estimate the position of the reference vehicle relative to the ego vehicle over the series of images.

For example, in some aspects, the ego vehicle may use one or more position sensors, motion sensors, and/or other suitable sensors to determine an accurate position of the ego vehicle at respective points in time when the series of images depicting the reference vehicle are captured. Furthermore, based on the estimated measurement related to the size of the vehicle and a size of the corresponding feature of the vehicle that is measured in pixels in each image, the on-board system may determine a distance between the ego vehicle and the reference vehicle in each image. For example, as described above, the estimated measurement related to the size of the vehicle may generally correspond to any suitable well-defined visual feature of the reference vehicle, such as a height, a width, a wheel size, a license plate size, a taillight size, or a rear window size, among other examples. Accordingly, the size of the visual feature may be estimated (e.g., in meters, feet, or another suitable metric) and the corresponding visual feature may also be measured in pixels in each image. In some aspects, the estimated size of the visual feature and one or more intrinsic parameters related to the camera used to capture the images of the reference vehicle may be used to determine the distance between the ego vehicle and the reference vehicle in each image based on the number of pixels occupied by the visual feature in each image. For example, in cases where a pinhole camera model is used to capture the series of images, the distance between the ego vehicle and the reference vehicle in each image may be calculated as follows:

$$d = \frac{fH}{h}$$

where d is the distance between the ego vehicle and the reference vehicle in a particular image, f is a camera focal length, H is the estimated (or assumed) measurement of the visual feature related to the size of the reference vehicle (e.g., a height in meters or feet), and h is the number of pixels corresponding the visual feature of the reference vehicle in the image (e.g., a height in pixels). In this example, the camera focal length is the intrinsic camera parameter used to transform a pixel size of the visual feature in an image to the distance between the ego vehicle and the reference vehicle in the image. Additionally, or alternatively, depending on the camera model and/or the camera configuration used to capture the series of images, other intrinsic parameters may be used to transform between pixel size and distance (e.g., optical center, aperture, field-of-view, resolution, and/or distortion characteristics). Furthermore, in some aspects, a function used to transform a pixel size of a visual feature of the reference vehicle into a distance between the ego vehicle and the reference vehicle may incorporate a noise model. For example, the noise model may define one or more parameters that relate to a size-dependent factor or bias associated with the pixel measurements in an image (e.g., a size estimate associated with a pixel measurement for a reference vehicle that is in the far distance ahead of the ego vehicle may be associated with a large error, which may be taken into consideration in the noise model). Additionally, or alternatively, the function used to transform between pixel size and distance may incorporate parameters related to estimated properties of the reference vehicle, such as a pose (e.g., a location and an orientation associated with the reference vehicle). Additionally, or alternatively, the distance between the ego vehicle and the reference vehicle in each image may be estimated using a machine learning model.

As further shown in FIG. 4A, and by reference number 415, the on-board system may then estimate a surface geometry associated with the road segment ahead of the ego vehicle based on a trajectory of the reference vehicle that is tracked over the series of images. For example, in some aspects, the on-board system may determine the distance between the ego vehicle and the reference vehicle in each image as described above, and/or may determine other properties of the tracked reference vehicle, such as pose. Accordingly, the estimated size of the reference vehicle can be used to estimate the position and/or orientation of the reference vehicle relative to the ego vehicle over time based on the size and position of the reference vehicle in each image (e.g., in pixels), which may indicate a trajectory of the reference vehicle along the road segment ahead of the ego vehicle. In this way, by tracking detections of the reference vehicle over time, the estimated trajectory traveled by the reference vehicle can be tracked and used to estimate parameters related to the surface geometry of the road segment, such as an alignment and/or profile of the road segment. For example, the alignment of a road segment may refer to the route associated with the road segment, which is defined as a series of horizontal tangents (e.g., straight sections of road) and circular horizontal curves (e.g., defined by a radius, or tightness, and a deflection angle, or extent) that connect the horizontal tangents. Furthermore, the profile of a road segment may be defined as a series of road slopes, or grades, that are connected by parabolic vertical curves used to provide a gradual change from one road slope to another such that vehicles can smoothly navigate grade changes during travel.

Accordingly, the estimated surface geometry of the road segment can then be used in any suitable autonomous driving or ADAS application, such as vehicle control and/or lane keeping. Furthermore, in some aspects, the trajectory of the reference vehicle may be used to estimate the surface geometry of the road segment ahead of the ego vehicle based on the reference vehicle and the ego vehicle having similar trajectories (e.g., traveling along the same road segment in the same direction, or in the same lane when there is a significant variation in the road alignment and/or road profile between different lanes). Furthermore, in cases where the trajectories of multiple reference vehicles are tracked, the estimated surface geometry may be based on an aggregation of the trajectories that are individually estimated for each reference vehicle. In addition, in some aspects, the estimated surface geometry of the road segment can be used to track trajectories of one or more objects that are depicted in the series of images (e.g., the estimated road surface may be used to improve estimated positions of objects over time), which may be used to improve autonomous driving (e.g., obstacle avoidance) and/or ADAS functionality (e.g., adaptive cruise control).

As further shown in FIG. 4A, and by reference number 420, the on-board system may track an actual trajectory traveled by the ego vehicle. For example, in some aspects, the ego vehicle may include inertial measurement units, positioning sensors, motion sensors, and/or other suitable sensors and/or may support visual odometry techniques that can be used to accurately estimate the surface geometry of the path traveled by the ego vehicle. Accordingly, measurements that indicate ego motion of the ego vehicle can be used to determine the actual trajectory of the ego vehicle over a portion of the road segment, which can be compared to the trajectory of the reference vehicle that was estimated for the same portion of the road segment to improve the estimated surface geometry for an untraveled portion of the road segment. For example, as shown by reference number 425, the estimated size of the reference vehicle (e.g., the estimated size of a visual feature associated with the reference vehicle, such as a height, width, wheel size, or the like) may be updated based on the actual trajectory traveled by the ego vehicle over a portion of the road segment for which the trajectory of the reference vehicle was estimated. For example, as described in further detail below with reference to FIG. 4B, the estimated size of the reference vehicle may be updated by determining an updated value that minimizes an error metric between the actual trajectory of the ego vehicle and the estimated trajectory of the reference vehicle over a particular portion of the road segment. As further shown in FIG. 4A, and by reference number 430, the updated size estimate can then be used to improve or otherwise update the estimated trajectory of the reference vehicle, and therefore the estimated surface geometry, over an untraveled portion of the road segment ahead of the ego vehicle. Furthermore, in cases where multiple reference vehicles are tracked, the estimated surface geometry may be updated by updating the individual trajectory estimates for each reference vehicle, and aggregating the individual trajectory estimates (e.g., each new frame or image provides an update to the size estimate for each reference vehicle that is tracked as well as the estimated surface geometry of the road segment).

For example, referring to FIG. 4B, reference number 435 indicates an actual surface geometry of a road segment that is traveled by the ego vehicle, and reference number 440 depicts an estimated location of a reference vehicle when the reference vehicle was first (e.g., initially) detected. Accordingly, in the example depicted in FIG. 4B, the ego vehicle may estimate (e.g., using the on-board system 120) the size of the reference vehicle when the reference vehicle is first detected, and may then track the position and/or pose of the reference vehicle relative to the ego vehicle over time based on a series of subsequent images that depict the reference vehicle traveling on the road segment ahead of the ego vehicle (e.g., based on the size of the reference vehicle in each image). In some aspects, as described herein, the estimated size of the reference vehicle and the position and/or pose of the reference vehicle relative to the ego vehicle may be used to track an estimated trajectory of the reference vehicle over time, starting from the first or initial detection of the reference vehicle. For example, reference number 445 indicates the estimated surface geometry of the road segment traveled by the reference vehicle, which starts at the estimated position of the reference vehicle when the reference vehicle was first detected. Accordingly, after the ego vehicle has traveled a portion of the road segment that overlaps with a portion of the road segment for which the surface geometry was estimated based on the tracked trajectory of the reference vehicle, the on-board system associated with the ego vehicle may update or otherwise improve the size estimates of the reference vehicle to update or otherwise improve an estimated surface geometry for an upcoming (untraveled) portion of the road segment that is covered by the historical trajectory tracked for the reference vehicle. For example, in FIG. 4B, reference number 450 depicts an actual road geometry for the road segment along which the reference vehicle and ego vehicle are traveling, which deviates from the estimated road geometry based on the tracked trajectory of the reference vehicle.

Accordingly, as shown by reference number 455, the on-board system may calculate an updated size estimate for the reference vehicle that provides a best match between the actual trajectory traveled by the ego vehicle and the estimated trajectory of the reference vehicle over the traveled portion of the road segment. For example, in cases where the estimated trajectory of the reference vehicle is directly coupled with the estimated size of a visual feature associated with the reference vehicle (e.g., a height, width, taillight size, or the like), a change in the estimated size provides a well-defined change to the estimated distance between the ego vehicle and the reference vehicle in each image. Accordingly, in some aspects, the on-board system may determine an updated value for the estimated measurement related to the size of the reference vehicle that provides the best match between the actual trajectory of the ego vehicle over a traveled portion of the road segment and the estimated trajectory of the reference vehicle over the same portion of the road segment. For example, in some aspects, the best match between the actual trajectory of the ego vehicle and the estimated trajectory of the reference vehicle may be defined as an estimated trajectory that minimizes an error metric, such as a mean square error, between the actual trajectory of the ego vehicle and the estimated trajectory of the reference vehicle.

For example, in FIG. 4B, the bold line indicates the actual trajectory traveled by the ego vehicle, and the dotted lines indicate estimated trajectories of the reference vehicle that are based on different size estimates (e.g., $H_0, \ldots H_i, \ldots H_N$). In the illustrated example, the middle value estimate ($H=H_i$) minimizes the error between the actual trajectory of the ego vehicle and the estimated trajectory of the reference vehicle, whereby the estimated size of the reference vehicle may be set to $H_i$. Additionally, or alternatively, in cases where a machine learning model is used to estimate the size of the reference vehicle and/or the distance between the ego vehicle and the reference vehicle, matching between the actual trajectory traveled by the ego vehicle and the estimated trajectory of the reference vehicle may be used to compensate for systemic errors in the machine learning model. Furthermore, as shown, the updated size estimate can be used to update the surface geometry of the untraveled portion of the road segment ahead of the ego vehicle by updating the tracked trajectory of the reference vehicle (shown as a dashed line). In other words, the improved size estimate for a tracked reference vehicle can be used to improve the historical and future distance and trajectory estimates for the tracked reference vehicle and any aggregated estimate of a surface geometry for a road segment that incorporates the estimated trajectory for the tracked reference vehicle. Furthermore, in some cases, the accurate trajectory of the ego vehicle that is tracked over the traveled portion of the road segment may be extended within a threshold distance in front of the vehicle (e.g., using structure from motion techniques).

Additionally, or alternatively, in some aspects, the estimated distance between the ego vehicle and the reference vehicle at the time when a particular image of the reference vehicle is captured may be determined by relating the position of the vehicle to a landmark or other visual feature in the image that can be tracked over the series of images (e.g., using computer vision). In such cases, when the ego vehicle reaches the tracked landmark or visual feature, the on-board system may determine an accurate estimate of the distance between the ego vehicle and the reference vehicle at the time when the image was captured. For example, when the on-board system observes the reference vehicle passing a stop sign (or any other visually trackable landmark or feature) in the series of images, the on-board system may track the stop sign until the ego vehicle reaches the stop sign, and may determine an accurate estimate of the distance between the ego vehicle and the reference vehicle at the time when the image of the reference vehicle passing the stop sign was captured (e.g., based on a position estimate of the ego vehicle at the time when the image of the reference vehicle passing the stop sign was captured and a position estimate of the ego vehicle at the time that the ego vehicle reached the stop sign). In this way, the accurate distance measure can be used to update the size estimate for the reference vehicle, the estimated trajectory of the reference vehicle along an untraveled portion of the road segment ahead of the ego vehicle, and/or the estimated surface geometry for the untraveled portion of the road segment ahead of the ego vehicle.

As indicated above, FIGS. 4A-4B are provided as an example. Other examples may differ from what is described with respect to FIGS. 4A-4B.

Figure 5:
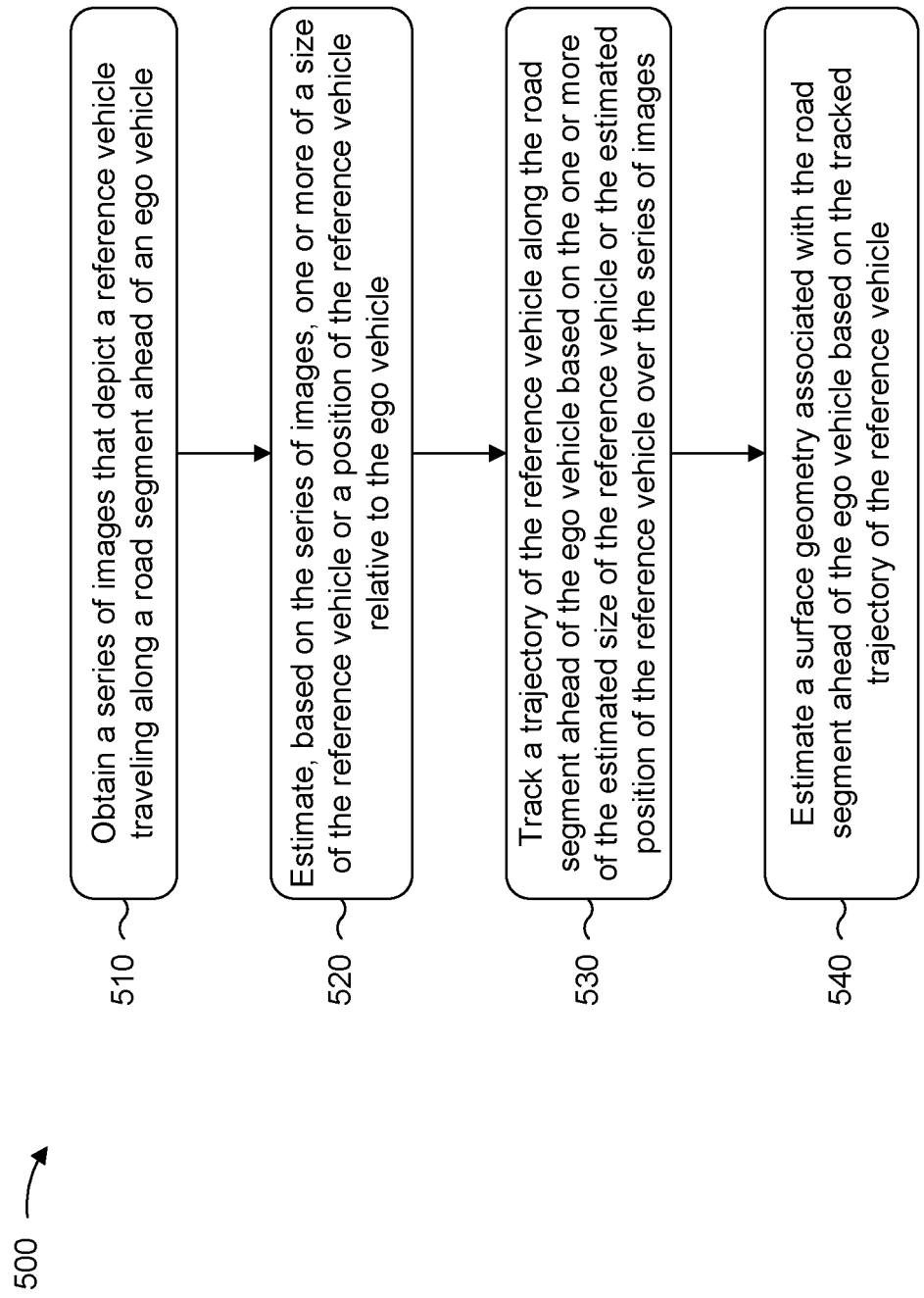
FIG. 5 is a flowchart of an example process associated with estimating a road surface using vehicle detection, in accordance with the present disclosure.

FIG. 5 is a flowchart of an example process 500 associated with road surface estimation using vehicle detection. In some aspects, one or more process blocks of FIG. 5 are performed by a device (e.g., on-board system 120, on-board device 208, or the like). In some aspects, one or more process blocks of FIG. 5 are performed by another device or a group of devices separate from or including the device, such as a network node (e.g., network node 150) and/or a remote device (e.g., remote device 130).

Additionally, or alternatively, one or more process blocks of FIG. 5 may be performed by device 300 or one or more components of device 300, such as processor 310, memory 315, input component 320, output component 325, communication component 330, and/or estimation component 335.

As shown in FIG. 5, process 500 may include obtaining a series of images that depict a reference vehicle traveling along a road segment ahead of an ego vehicle (block 510). For example, the device may obtain a series of images that depict a reference vehicle traveling along a road segment ahead of an ego vehicle, as described above.

As further shown in FIG. 5, process 500 may include estimating, based on the series of images, one or more of a size of the reference vehicle or a position of the reference vehicle relative to the ego vehicle (block 520). For example, the device may estimate, based on the series of images, one or more of a size of the reference vehicle or a position of the reference vehicle relative to the ego vehicle, as described above.

As further shown in FIG. 5, process 500 may include tracking a trajectory of the reference vehicle along the road segment ahead of the ego vehicle based on one or more of the estimated size of the reference vehicle or the estimated position of the reference vehicle over the series of images (block 530). For example, the device may track a trajectory of the reference vehicle along the road segment ahead of the ego vehicle based on one or more of the estimated size of the reference vehicle or the estimated position of the reference vehicle over the series of images, as described above.

As further shown in FIG. 5, process 500 may include estimating a surface geometry associated with the road segment ahead of the ego vehicle based on the tracked trajectory of the reference vehicle (block 540). For example, the device may estimate a surface geometry associated with the road segment ahead of the ego vehicle based on the tracked trajectory of the reference vehicle, as described above.

Process 500 may include additional aspects, such as any single aspect or any combination of aspects described below and/or in connection with one or more other processes described elsewhere herein.

In a first aspect, the estimated surface geometry associated with the road segment includes an alignment and a profile associated with the road segment.

In a second aspect, alone or in combination with the first aspect, the tracked trajectory of the reference vehicle is used to estimate the surface geometry associated with the road segment ahead of the ego vehicle based on the reference vehicle and the ego vehicle having similar trajectories.

In a third aspect, alone or in combination with one or more of the first and second aspects, process 500 includes obtaining measurements that indicate an actual trajectory of the ego vehicle along a portion of the road segment traveled by the ego vehicle, and updating the estimated size of the reference vehicle based on the actual trajectory of the ego vehicle and the tracked trajectory of the reference vehicle along the traveled portion of the road segment.

In a fourth aspect, alone or in combination with one or more of the first through third aspects, process 500 includes updating the estimated surface geometry for an untraveled portion of the road segment based on the tracked trajectory of the reference vehicle along the untraveled portion of road segment and the updated size of the reference vehicle.

In a fifth aspect, alone or in combination with one or more of the first through fourth aspects, updating the estimated size of the reference vehicle includes calculating a physical size of the reference vehicle that minimizes an error between the actual trajectory of the ego vehicle and the tracked trajectory of the reference vehicle along the traveled portion of the road segment.

In a sixth aspect, alone or in combination with one or more of the first through fifth aspects, process 500 includes extending the actual trajectory of the ego vehicle into an untraveled portion of the road segment ahead of the ego vehicle using one or more structure from motion techniques.

In a seventh aspect, alone or in combination with one or more of the first through sixth aspects, process 500 includes associating the position of the reference vehicle over the series of images with a landmark that is depicted in the series of images, and tracking the landmark over the series of images, wherein the position of the reference vehicle relative to the ego vehicle is updated based on the ego vehicle reaching a position of the landmark.

In an eighth aspect, alone or in combination with one or more of the first through seventh aspects, the reference vehicle is included among multiple reference vehicles associated with tracked trajectories along the road segment ahead of the ego vehicle, and the estimated surface geometry associated with the road segment is based on an aggregation of the tracked trajectories of the multiple reference vehicles.

In a ninth aspect, alone or in combination with one or more of the first through eighth aspects, estimating the position of the reference vehicle relative to the ego vehicle includes estimating, for each image in the series of images, a distance between the ego vehicle and the reference vehicle based on one or more intrinsic parameters associated with a camera used to capture the series of images, an estimated measurement related to the size of the reference vehicle, and a measurement related to the size of the reference vehicle that is measured in pixels based on the image.

In a tenth aspect, alone or in combination with one or more of the first through ninth aspects, the estimated distance between the ego vehicle and the reference vehicle is further based on a noise model.

In an eleventh aspect, alone or in combination with one or more of the first through tenth aspects, the estimated distance between the ego vehicle and the reference vehicle is further based on an estimated pose of the reference vehicle.

In a twelfth aspect, alone or in combination with one or more of the first through eleventh aspects, process 500 includes tracking a trajectory of an object depicted in the series of images based on the estimated surface geometry associated with the road segment ahead of the ego vehicle.

In a thirteenth aspect, alone or in combination with one or more of the first through twelfth aspects, one or more of the size of the reference vehicle or the position of the reference vehicle relative to the ego vehicle are estimated using a machine learning model.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method for road surface estimation using vehicle detection, comprising: obtaining, by a device associated with an ego vehicle, a series of images that depict a reference vehicle traveling along a road segment ahead of the ego vehicle; estimating, by the device based on the series of images, one or more of a size of the reference vehicle or a position of the reference vehicle relative to the ego vehicle; tracking, by the device, a trajectory of the reference vehicle along the road segment ahead of the ego vehicle based on one or more of the estimated size of the reference vehicle or the estimated position of the reference vehicle over the series of images; and estimating, by the device, a surface geometry associated with the road segment ahead of the ego vehicle based on the tracked trajectory of the reference vehicle.

Aspect 2: The method of Aspect 1, wherein the estimated surface geometry associated with the road segment includes an alignment and a profile associated with the road segment.

Aspect 3: The method of any of Aspects 1-2, wherein the tracked trajectory of the reference vehicle is used to estimate the surface geometry associated with the road segment ahead of the ego vehicle based on the reference vehicle and the ego vehicle having similar trajectories.

Aspect 4: The method of any of Aspects 1-3, further comprising: obtaining measurements that indicate an actual trajectory of the ego vehicle along a portion of the road segment traveled by the ego vehicle; and updating the estimated size of the reference vehicle based on the actual trajectory of the ego vehicle and the tracked trajectory of the reference vehicle along the traveled portion of the road segment.

Aspect 5: The method of Aspect 4, further comprising: updating the estimated surface geometry for an untraveled portion of the road segment based on the tracked trajectory of the reference vehicle along the untraveled portion of road segment and the updated size of the reference vehicle.

Aspect 6: The method of Aspect 4, wherein updating the estimated size of the reference vehicle includes: calculating a physical size of the reference vehicle that minimizes an error between the actual trajectory of the ego vehicle and the tracked trajectory of the reference vehicle along the traveled portion of the road segment.

Aspect 7: The method of Aspect 4, further comprising: extending the actual trajectory of the ego vehicle into an untraveled portion of the road segment ahead of the ego vehicle using one or more structure from motion techniques.

Aspect 8: The method of Aspect 4, further comprising: associating the position of the reference vehicle over the series of images with a landmark that is depicted in the series of images; and tracking the landmark over the series of images, wherein the position of the reference vehicle relative to the ego vehicle is updated based on the ego vehicle reaching a position of the landmark.

Aspect 9: The method of any of Aspects 1-8, wherein the reference vehicle is included among multiple reference vehicles associated with tracked trajectories along the road segment ahead of the ego vehicle, and wherein the estimated surface geometry associated with the road segment is based on an aggregation of the tracked trajectories of the multiple reference vehicles.

Aspect 10: The method of any of Aspects 1-9, wherein estimating the position of the reference vehicle relative to the ego vehicle includes: estimating, for each image in the series of images, a distance between the ego vehicle and the reference vehicle based on one or more intrinsic parameters associated with a camera used to capture the series of images, an estimated measurement related to the size of the reference vehicle, and a measurement related to the size of the reference vehicle that is measured in pixels based on the image.

Aspect 11: The method of Aspect 10, wherein the estimated distance between the ego vehicle and the reference vehicle is further based on a noise model.

Aspect 12: The method of Aspect 10, wherein the estimated distance between the ego vehicle and the reference vehicle is further based on an estimated pose of the reference vehicle.

Aspect 13: The method of any of Aspects 1-12, further comprising: tracking a trajectory of an object depicted in the series of images based on the estimated surface geometry associated with the road segment ahead of the ego vehicle.

Aspect 14: The method of any of Aspects 1-13, wherein one or more of the size of the reference vehicle or the position of the reference vehicle relative to the ego vehicle are estimated using a machine learning model.

Aspect 15: A device for road surface estimation using vehicle detection, comprising: a memory; and one or more processors, coupled to the memory, configured to: obtain a series of images that depict a reference vehicle traveling along a road segment ahead of an ego vehicle; estimate, based on the series of images, one or more of a size of the reference vehicle or a position of the reference vehicle relative to the ego vehicle; track a trajectory of the reference vehicle along the road segment ahead of the ego vehicle based on one or more of the estimated size of the reference vehicle or the estimated position of the reference vehicle over the series of images; and estimate a surface geometry associated with the road segment ahead of the ego vehicle based on the tracked trajectory of the reference vehicle.

Aspect 16: The device of Aspect 15, wherein the estimated surface geometry associated with the road segment includes an alignment and a profile associated with the road segment.

Aspect 17: The device of any of Aspects 15-16, wherein the tracked trajectory of the reference vehicle is used to estimate the surface geometry associated with the road segment ahead of the ego vehicle based on the reference vehicle and the ego vehicle having similar trajectories.

Aspect 18: The device of any of Aspects 15-17, wherein the one or more processors are further configured to: obtain measurements that indicate an actual trajectory of the ego vehicle along a portion of the road segment traveled by the ego vehicle; and update the estimated size of the reference vehicle based on the actual trajectory of the ego vehicle and the tracked trajectory of the reference vehicle along the traveled portion of the road segment.

Aspect 19: The device of Aspect 18, wherein the one or more processors are further configured to: update the estimated surface geometry for an untraveled portion of the road segment based on the tracked trajectory of the reference vehicle along the untraveled portion of road segment and the updated size of the reference vehicle.

Aspect 20: The device of Aspect 18, wherein the one or more processors, to update the estimated size of the reference vehicle, are configured to: calculate a physical size of the reference vehicle that minimizes an error between the actual trajectory of the ego vehicle and the tracked trajectory of the reference vehicle along the traveled portion of the road segment.

Aspect 21: The device of Aspect 18, wherein the one or more processors are further configured to: extend the actual trajectory of the ego vehicle into an untraveled portion of the road segment ahead of the ego vehicle using one or more structure from motion techniques.

Aspect 22: The device of Aspect 18, wherein the one or more processors are further configured to: associate the position of the reference vehicle over the series of images with a landmark that is depicted in the series of images; and track the landmark over the series of images, wherein the position of the reference vehicle relative to the ego vehicle is updated based on the ego vehicle reaching a position of the landmark.

Aspect 23: The device of any of Aspects 15-22, wherein the reference vehicle is included among multiple reference vehicles associated with tracked trajectories along the road segment ahead of the ego vehicle, and wherein the estimated surface geometry associated with the road segment is based on an aggregation of the tracked trajectories of the multiple reference vehicles.

Aspect 24: The device of any of Aspects 15-23, wherein the one or more processors, to estimate the position of the reference vehicle relative to the ego vehicle, are configured to: estimate, for each image in the series of images, a distance between the ego vehicle and the reference vehicle based on one or more intrinsic parameters associated with a camera used to capture the series of images, an estimated measurement related to the size of the reference vehicle, and a measurement related to the size of the reference vehicle that is measured in pixels based on the image.

Aspect 25: The device of Aspect 24, wherein the estimated distance between the ego vehicle and the reference vehicle is further based on a noise model.

Aspect 26: The device of Aspect 24, wherein the estimated distance between the ego vehicle and the reference vehicle is further based on an estimated pose of the reference vehicle.

Aspect 27: The device of any of Aspects 15-26, wherein the one or more processors are further configured to: track a trajectory of an object depicted in the series of images based on the estimated surface geometry associated with the road segment ahead of the ego vehicle.

Aspect 28: The device of any of Aspects 15-27, wherein one or more of the size of the reference vehicle or the position of the reference vehicle relative to the ego vehicle are estimated using a machine learning model.

Aspect 29: A non-transitory computer-readable medium storing a set of instructions, the set of instructions comprising: one or more instructions that, when executed by one or more processors of a device, cause the device to: obtain a series of images that depict a reference vehicle traveling along a road segment ahead of an ego vehicle; estimate, based on the series of images, one or more of a size of the reference vehicle or a position of the reference vehicle relative to the ego vehicle; track a trajectory of the reference vehicle along the road segment ahead of the ego vehicle based on one or more of the estimated size of the reference vehicle or the estimated position of the reference vehicle over the series of images; and estimate a surface geometry associated with the road segment ahead of the ego vehicle based on the tracked trajectory of the reference vehicle.

Aspect 30: An apparatus, comprising: means for obtaining a series of images that depict a reference vehicle traveling along a road segment ahead of an ego vehicle; means for estimating, based on the series of images, one or more of a size of the reference vehicle or a position of the reference vehicle relative to the ego vehicle; means for tracking a trajectory of the reference vehicle along the road segment ahead of the ego vehicle based on one or more of the estimated size of the reference vehicle or the estimated position of the reference vehicle over the series of images; and means for estimating a surface geometry associated with the road segment ahead of the ego vehicle based on the tracked trajectory of the reference vehicle.

Aspect 31: A system configured to perform one or more operations recited in one or more of Aspects 1-30.

Aspect 32: An apparatus comprising means for performing one or more operations recited in one or more of Aspects 1-30.

Aspect 33: A non-transitory computer-readable medium storing a set of instructions, the set of instructions comprising one or more instructions that, when executed by a device, cause the device to perform one or more operations recited in one or more of Aspects 1-30.

Aspect 34: A computer program product comprising instructions or code for executing one or more operations recited in one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for road surface estimation using vehicle detection, comprising:
   obtaining, by one or more of a camera-based vision system, a lidar system, or a radar system of an ego vehicle, a series of images that depict a reference vehicle traveling along a road segment ahead of the ego vehicle;
   estimating, by a device of the ego vehicle, a size of the reference vehicle and a position of the reference vehicle relative to the ego vehicle based on the series of images, wherein the estimating the size comprising:
   determining a plurality of estimated trajectories corresponding to a plurality of height estimates of the reference vehicle, and
   selecting a height estimate of the reference vehicle, from among the plurality of height estimates, that minimizes an error between an actual trajectory of the ego vehicle and an estimated trajectory of the plurality of estimated trajectories that corresponds to the height estimate;
   tracking, by the device, a trajectory of the reference vehicle along the road segment ahead of the ego vehicle based at least in part on the height estimate of the reference vehicle;
   estimating, by the device, a surface geometry associated with the road segment ahead of the ego vehicle based on the tracked trajectory of the reference vehicle; and
   adjusting, by the device, trajectory of the ego vehicle based on the estimated surface geometry.

2. The method of claim 1, wherein the estimated surface geometry associated with the road segment includes an alignment and a profile associated with the road segment.

3. The method of claim 1, wherein the tracked trajectory of the reference vehicle is used to estimate the surface geometry associated with the road segment ahead of the ego vehicle based on the reference vehicle and the ego vehicle having similar trajectories.

4. The method of claim 1, further comprising:
   obtaining measurements that indicate an actual trajectory of the ego vehicle along a portion of the road segment traveled by the ego vehicle; and
   updating the estimated size of the reference vehicle based on the actual trajectory of the ego vehicle and the tracked trajectory of the reference vehicle along the portion of the road segment.

5. The method of claim 4, further comprising:
   updating the estimated surface geometry for an untraveled portion of the road segment based on the tracked trajectory of the reference vehicle along the untraveled portion of road segment and the updated size of the reference vehicle.

6. The method of claim 4, further comprising:
   extending the actual trajectory of the ego vehicle into an untraveled portion of the road segment ahead of the ego vehicle using one or more structure from motion techniques.

7. The method of claim 4, further comprising:
   associating the position of the reference vehicle over the series of images with a landmark that is depicted in the series of images; and
   tracking the landmark over the series of images, wherein the position of the reference vehicle relative to the ego vehicle is updated based on the ego vehicle reaching a position of the landmark.

8. The method of claim 1, wherein the reference vehicle is included among multiple reference vehicles associated with tracked trajectories along the road segment ahead of the ego vehicle, and wherein the estimated surface geometry associated with the road segment is based on an aggregation of the tracked trajectories of the multiple reference vehicles.

9. The method of claim 1, wherein estimating the position of the reference vehicle relative to the ego vehicle includes:
   estimating, for each image in the series of images, a distance between the ego vehicle and the reference vehicle based on one or more intrinsic parameters associated with the camera-based vision system used to capture the series of images, an estimated measurement related to the size of the reference vehicle, and a measurement related to the size of the reference vehicle that is measured in pixels based on the image.

10. The method of claim 9, wherein the estimated distance between the ego vehicle and the reference vehicle is further based on a noise model.

11. The method of claim 9, wherein the estimated distance between the ego vehicle and the reference vehicle is further based on an estimated pose of the reference vehicle.

12. The method of claim 1, further comprising:
tracking a trajectory of an object depicted in the series of images based on the estimated surface geometry associated with the road segment ahead of the ego vehicle.

13. The method of claim 1, wherein the size of the reference vehicle and the position of the reference vehicle relative to the ego vehicle are estimated using a machine learning model.

14. A device for road surface estimation using vehicle detection, comprising:
a memory; and
one or more processors, coupled to the memory, configured to:
obtain, using one or more of a camera-based vision system, a lidar system, or a radar system of an ego vehicle, a series of images that depict a reference vehicle traveling along a road segment ahead of an ego vehicle;
estimate one or more of a size of the reference vehicle or a position of the reference vehicle relative to the ego vehicle based on the series of images, wherein to estimate the one or more of the size, the one or more processors are configured to:
determine a plurality of estimated trajectories corresponding to a plurality of height estimates of the reference vehicle, and
select a height estimate of the reference vehicle, from among the plurality of height estimates, that minimizes an error between an actual trajectory of the ego vehicle and an estimated trajectory of the plurality of estimated trajectories that corresponds to the height estimate;
track a trajectory of the reference vehicle along the road segment ahead of the ego vehicle based at least in part on the height estimate of the reference vehicle;
estimate a surface geometry associated with the road segment ahead of the ego vehicle based on the tracked trajectory of the reference vehicle; and
adjust trajectory of the ego vehicle based on the estimated surface geometry.

15. The device of claim 14, wherein the estimated surface geometry associated with the road segment includes an alignment and a profile associated with the road segment.

16. The device of claim 14, wherein the tracked trajectory of the reference vehicle is used to estimate the surface geometry associated with the road segment ahead of the ego vehicle based on the reference vehicle and the ego vehicle having similar trajectories.

17. The device of claim 14, wherein the one or more processors are further configured to:
obtain measurements that indicate an actual trajectory of the ego vehicle along a portion of the road segment traveled by the ego vehicle; and
update the estimated size of the reference vehicle based on the actual trajectory of the ego vehicle and the tracked trajectory of the reference vehicle along the portion of the road segment.

18. The device of claim 17, wherein the one or more processors are further configured to:
update the estimated surface geometry for an untraveled portion of the road segment based on the tracked trajectory of the reference vehicle along the untraveled portion of road segment and the updated size of the reference vehicle.

19. The device of claim 17, wherein the one or more processors are further configured to:
extend the actual trajectory of the ego vehicle into an untraveled portion of the road segment ahead of the ego vehicle using one or more structure from motion techniques.

20. The device of claim 17, wherein the one or more processors are further configured to:
associate the position of the reference vehicle over the series of images with a landmark that is depicted in the series of images; and
track the landmark over the series of images, wherein the position of the reference vehicle relative to the ego vehicle is updated based on the ego vehicle reaching a position of the landmark.

21. The device of claim 14, wherein the reference vehicle is included among multiple reference vehicles associated with tracked trajectories along the road segment ahead of the ego vehicle, and wherein the estimated surface geometry associated with the road segment is based on an aggregation of the tracked trajectories of the multiple reference vehicles.

22. The device of claim 14, wherein the one or more processors, to estimate the position of the reference vehicle relative to the ego vehicle, are configured to:
estimate, for each image in the series of images, a distance between the ego vehicle and the reference vehicle based on one or more intrinsic parameters associated with the camera-based vision system used to capture the series of images, an estimated measurement related to the size of the reference vehicle, and a measurement related to the size of the reference vehicle that is measured in pixels based on the image.

23. The device of claim 22, wherein the estimated distance between the ego vehicle and the reference vehicle is further based on a noise model.

24. The device of claim 22, wherein the estimated distance between the ego vehicle and the reference vehicle is further based on an estimated pose of the reference vehicle.

25. The device of claim 14, wherein the one or more processors are further configured to:
track a trajectory of an object depicted in the series of images based on the estimated surface geometry associated with the road segment ahead of the ego vehicle.

26. The device of claim 14, wherein the size of the reference vehicle and the position of the reference vehicle relative to the ego vehicle are estimated using a machine learning model.

27. A non-transitory computer-readable medium storing a set of instructions, the set of instructions comprising:
one or more instructions that, when executed by one or more processors of a device, cause the device to:
obtain, using one or more of a camera-based vision system, a lidar system, or a radar system of an ego vehicle, a series of images that depict a reference vehicle traveling along a road segment ahead of an ego vehicle;
estimate, one or more of a size of the reference vehicle or a position of the reference vehicle relative to the ego vehicle based on the series of images, wherein the one or more instructions, to cause the device to estimate the one or more of the size, cause the device to:
    determine a plurality of estimated trajectories corresponding to a plurality of height estimates of the reference vehicle, and
    select a height estimate of the reference vehicle, from among the plurality of height estimates, that minimizes an error between an actual trajectory of the ego vehicle and an estimated trajectory of the plurality of estimated trajectories that corresponds to the height estimate;
    track a trajectory of the reference vehicle along the road segment ahead of the ego vehicle based at least in part on the height estimate of the reference vehicle;
    estimate a surface geometry associated with the road segment ahead of the ego vehicle based on the tracked trajectory of the reference vehicle; and
    adjusting trajectory of the ego vehicle based on the estimated surface geometry.

28. An apparatus, comprising:
    means for obtaining, using one or more of a camera-based vision system, a lidar system, or a radar system of an ego vehicle, a series of images that depict a reference vehicle traveling along a road segment ahead of an ego vehicle;
    means for estimating, based on the series of images, one or more of a size of the reference vehicle or a position of the reference vehicle relative to the ego vehicle, wherein the estimating the one or more of the size comprising:
        means for determining a plurality of estimated trajectories corresponding to a plurality of height estimates of the reference vehicle, and
        means for selecting a height estimate of the reference vehicle, from among the plurality of height estimates, that minimizes an error between an actual trajectory of the ego vehicle and an estimated trajectory of the plurality of estimated trajectories that corresponds to the height estimate;
    means for tracking a trajectory of the reference vehicle along the road segment ahead of the ego vehicle based at least in part on the height estimate of the estimated size of the reference vehicle;
    means for estimating a surface geometry associated with the road segment ahead of the ego vehicle based on the tracked trajectory of the reference vehicle; and
    means for adjusting trajectory of the ego vehicle based on the estimated surface geometry.

29. The apparatus of claim 28, wherein the estimated surface geometry associated with the road segment includes an alignment and a profile associated with the road segment.

30. The apparatus of claim 28, wherein the tracked trajectory of the reference vehicle is used to estimate the surface geometry associated with the road segment ahead of the ego vehicle based on the reference vehicle and the ego vehicle having similar trajectories.

* * * * *